United States Patent [19]

Grenci

[11] 4,002,054
[45] Jan. 11, 1977

[54] METHOD AND MEANS FOR VOLUMETRIC EXPANSION TESTING

[76] Inventor: Carl A. Grenci, 4791 Lesa Place, Yorba Linda, Calif. 92686

[22] Filed: Aug. 4, 1975

[21] Appl. No.: 601,847

[52] U.S. Cl. .................................... 73/37; 73/149
[51] Int. Cl.² ................................... G01M 3/36
[58] Field of Search ........... 73/37, 37.5, 49.7, 49.8, 73/149, 433, 16; 177/1, 4, 50

[56] References Cited

UNITED STATES PATENTS

| | | | |
|---|---|---|---|
| 2,414,113 | 1/1947 | Mapes | 73/49.8 |
| 2,539,843 | 1/1951 | Kerr | 73/37 |
| 3,230,760 | 1/1966 | Fryer, Jr. et al. | 73/37 |
| 3,365,933 | 1/1968 | Jorgensen et al. | 73/37 |
| 3,534,587 | 10/1970 | Grenci | 73/49.8 |
| 3,545,262 | 12/1970 | Steele et al. | 73/49.7 X |
| 3,613,436 | 10/1971 | Drake et al. | 73/37 |
| 3,926,036 | 12/1975 | Bower | 73/37 |

Primary Examiner—Richard C. Queisser
Assistant Examiner—Joseph W. Roskos
Attorney, Agent, or Firm—Philip M. Hinderstein

[57] ABSTRACT

A method and means for hydrostatically testing the expansion of a vessel immersed in a fluid-filled jacket when subjected to an internal pressure to thereby determine total expansion and permanent expansion of the vessel. A conical pan is suspended from the sensing element of an electronic balance and means are provided for conducting fluid from the jacket to and from the conical pan without physically contacting the same. When pressure is applied to the vessel, the fluid expelled from the jacket is conducted into the pan, the electronic balance providing an indication of the total volumetric change in the vessel. When the pressure is released from the vessel, the fluid is conducted from the pan back into the jacket whereupon the electronic balance provides an indication of the permanent volumetric expansion. A spring suspends the pan from the electronic balance, the spring having a modulus of deflection which permits the fluid level in the pan to remain substantially constant as fluid is added to and removed therefrom.

16 Claims, 2 Drawing Figures

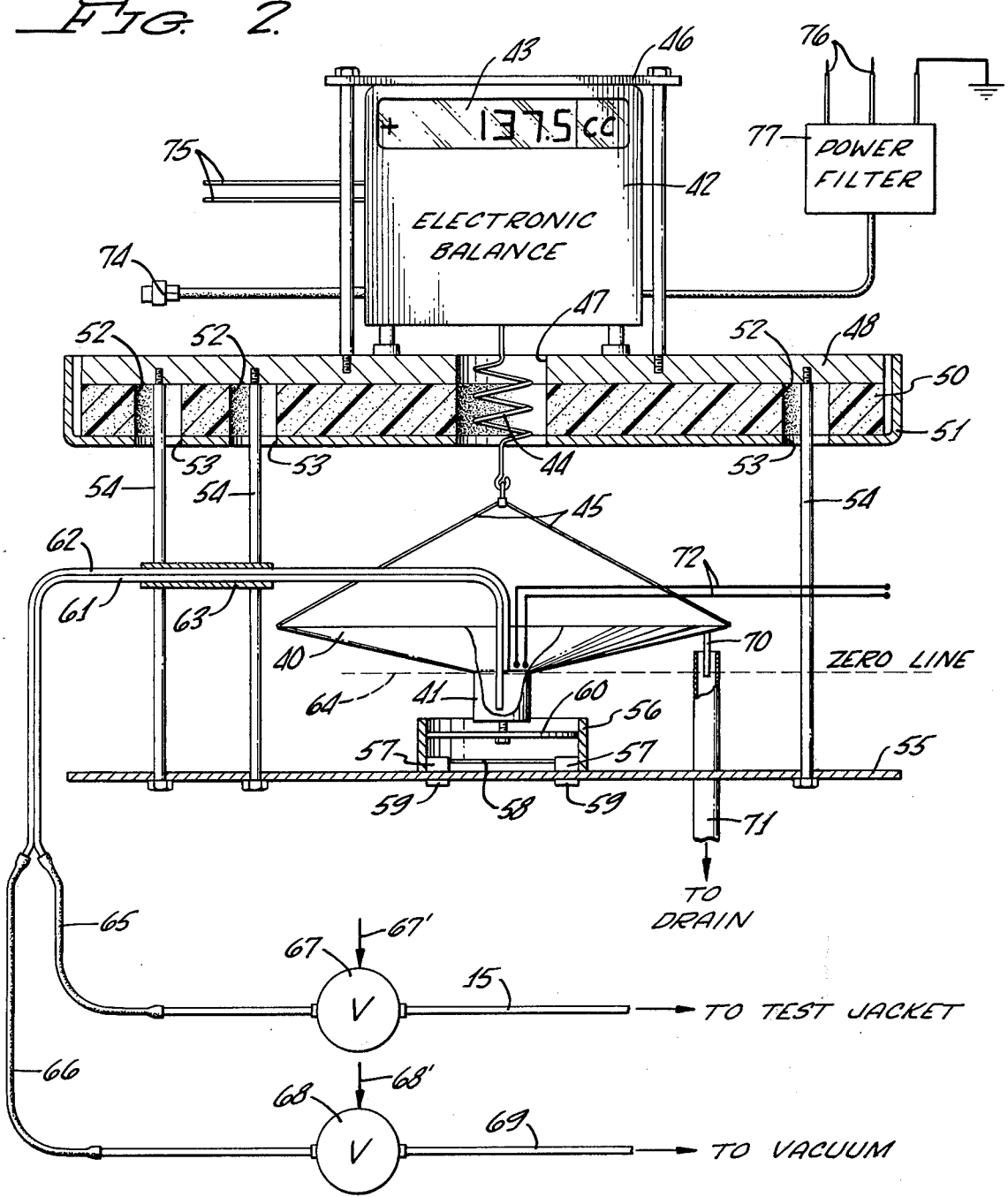

METHOD AND MEANS FOR VOLUMETRIC EXPANSION TESTING

BACKGROUND OF THE INVENTION

1. Field of the Invention

The present invention relates to a method and means for volumetric expansion testing and, more particularly, to a system for automatically displaying and recording the expansion data from the hydrostatic testing of pressure vessels with an accuracy and repeatability meeting or exceeding existing requirements.

2. Description of the Prior Art

High pressure steel cylinders conventionally are used to contain compressed gases for a wide variety of medical and industrial uses. Literally thousands of such compressed gas cylinders are in use daily to contain under pressure oxygen, nitrogen, hydrogen, argon, and other gases. To minimize the possibility of rupture of such cylinders, with the associated dangers of explosion and/or loss of combustible or poisonous gas, periodic expansion testing to determine the plastic and elastic deformation of the cylinders normally is carried out.

In accordance with U.S. Interstate Commerce Commission regulations, compressed gas cylinders used in interstate commerce must be checked once every five years by subjecting such cylinders to an internal pressure one and two-thirds times the working or rated pressure thereof. Conventionally, this testing is carried out hydrostatically in accordance with one of a few methods so as to accurately obtain total expansion, permanent expansion, and thereby percent permanent expansion. According to the most popular method, a cylinder is filled with water and sealed in a water-filled jacket connected to a burette. High pressure water is introduced into the water-filled cylinder, the pressure being raised to the requisite one and two-thirds times the nominal pressure of the cylinder. The amount of water displaced by expansion of the cylinder is then conducted to the burette so that total expansion may be determined by noting on the burette the amount of water displaced by the jacket as a result of the cylinder expansion.

To measure permanent expansion and percentage permanent expansion, the internal cylinder pressure is released. If the cylinder returns to its original shape, the burette will return to its zero position. If the cylinder does not return to within ten percent of its original shape, as indicated by the burette reading, the cylinder is considered defective. Such a cylinder could rupture when subjected subsequently to severe shock or stress while filled with high pressure compressed gas.

The other commonly used method of hydrostatic testing is the direct expansion method. However, since it has practical limitations in its use, it is used substantially less frequently than the water jacket expansion method. In any event, the direct expansion method consists of forcing a measurable volume of water into a cylinder filled with a known weight of water at a known temperature and measuring the volume of water expelled from the cylinder when pressure is released. The permanent volumetric expansion of the cylinder is calculated by subtracting the volume of water expelled from the volume of water forced into the cylinder. The total volumetric expansion of the cylinder is calculated by subtracting the compressibility of the volume of water in the cylinder, when under pressure, from the volume of water forced into the cylinder to raise the pressure to desired test pressure.

Since there are far fewer problems associated with obtaining accurate data with the water jacket volumetric expansion method, it is the predominant method in use. According to such method, the burette is raised or lowered to maintain the water level at a specific zero level in order to negate any errors caused by changes in hydrostatic head. However, movement of the calibrated glass burette and recording of the pressure vessel expansion values has all been done manually, which is slow and prone to error. The use of a human operator to gather the information also precluded the automation of this process to achieve greater productivity and accuracy.

In order to overcome this problem, suggestions have been made to use level detectors and servo mechanisms to raise and lower the burette, thereby interpreting such movement as expansion values. However, this method has proven to be too complex, requiring too many mechanical components with their attendant maintenance problems.

It has also been suggested to measure the weight of the displaced fluid to determine volumetric changes. However, this concept, too, has substantial problems. For example, it is necessary to establish a zero starting point automatically and repetitively in order to provide the degree of speed and accuracy which is necessary. The removal of residual water from a previous test as well as adding surplus water from the purging of the test jacket fluid expansion line in order to achieve the zero starting point repetitively and accurately requires changes in operating concepts far removed from those used with a calibrated burette. Furthermore, if a sensitive weighing element is to be used, it is necessary to isolate it from extraneous vibration to prevent wide fluctuations in the readings that could lead to inconsistent data. It is also necessary to develop a means of keeping the fluid level as close as possible to its original level as water is added or removed from the collection vessel so as not to introduce any errors caused by changes in hydrostatic head forces on the surfaces of the test jacket.

It is also necessary that the accuracy and repeatability of any system meet or equal the requirements of the Hazardous Materials Regulations of the Department of Transportation published by the Bureau of Explosives of the Association of American Railroads. These regulations state that the gauge indicating the total expansion of the cylinder must be such that the total expansion can be read with an accuracy of 1%, except that a reading of 0.1 cubic centimeters shall be acceptable. While the 1% provides a certain amount of leeway when testing large cylinders, the 0.1 cubic centimeter readability, as is required in the case of small cylinders, requires accuracies and repeatabilities that are difficult to achieve. As a result of these and other problems, no practical means has been developed heretofore for automating volumetric expansion testing so as to achieve greater productivity.

SUMMARY OF THE INVENTION

According to the present invention, there is provided a method and means for volumetric expansion testing which solves these problems in a manner unknown heretofore. According to the present method and means, the conventional water jacket volumetric expansion method or even the direct expansion method of hydrostatic testing of compressed gas cylinders may be substantially automated so as to achieve greater productivity without sacrificing any of the accuracy and repeatability requirements established in Department of Transportation regulations. The present method utilizes the principal of weighing the displaced fluid to determine volumetric change. This is achieved in a manner which establishes the zero starting point automatically and repetitively so as to provide the required degree of speed and accuracy. The present method utilizes a sensitive electronic balance which is mounted in such a manner as to isolate it from extraneous vibrations, thereby preventing fluctuations in the readings that could lead to inconsistencies in the data. The present method includes a technique for conducting fluid to and from a collecting pan without imposing any forces thereon which could be transmitted to the sensing element of the electronic balance. The weighing pan is suspended from the balance in a manner which permits the water level in the pan to remain very close to the same level as water is added to and removed therefrom so that hydrostatic head force changes do not occur. A novel floating piston assembly restricts excessive lateral or vertical movement of the collecting pan without imposing forces thereon that could effect the weight sensing action. The use of a valve in the test jacket fluid expansion line prevents the siphoning back of the fluid out of the pan when the test jacket is open. A pressure switch and monitor prevent erroneous readings in the event of head leakage or failure of the test jacket sealing mechanism.

OBJECTS

It is therefore an object of the present invention to provide a method and means for volumetric expansion testing.

It is a further object of the present invention to provide a method and means for automating the hydrostatic testing and retesting of compressed gas cylinders.

It is still a further object of the present invention to provide a method and means for volumetric expansion testing by weighing the amount of fluid added or substracted from a pan suspended from the weight sensing element of an electronic balance.

It is another object of the present invention to provide an automatic system for hydrostatically testing compressed gas cylinders which substantially increases productivity without sacrificing accuracy and repeatability.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 2 is a diagrammatic representation of the major elements of the present method and means for volumetric expansion testing.

DESCRIPTION OF THE PREFERRED EMBODIMENT

Figure 1:
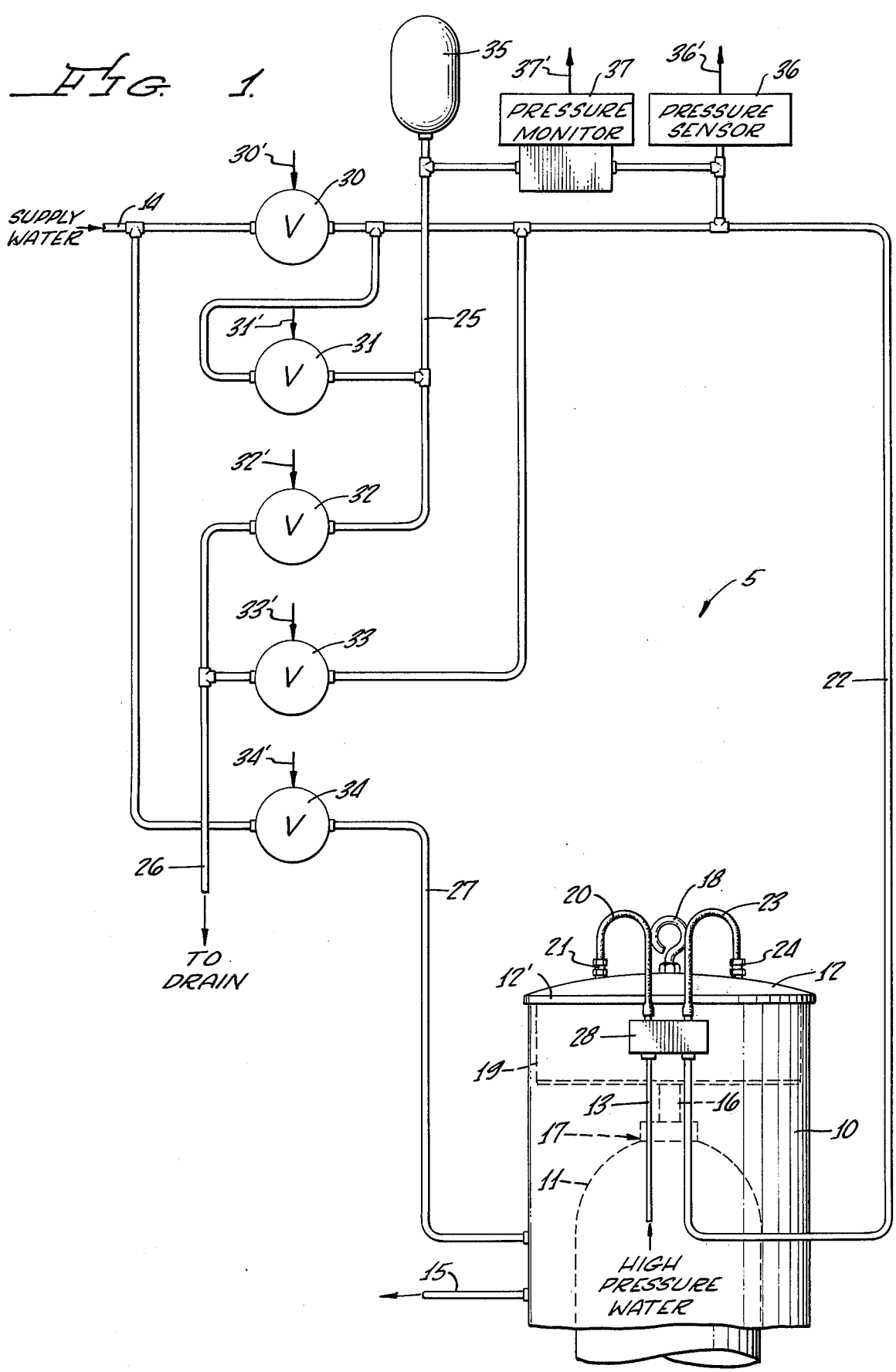
FIG. 1 is a diagrammatic view of the major components of a water jacket volumetric expansion method test assembly for hydrostatically testing compressed gas cylinders and incorporating a portion of the present system.

In my prior U.S. Pat. No. 3,534,587 issued Oct. 20, 1970, for Hydrostatic Neck Seal, there is disclosed a complete apparatus for hydrostatically testing compressed gas cylinders utilizing the before-described water jacket volumetric expansion method. For a fuller description of such method, reference should be had to such patent. For present purposes, and with reference not to FIG. 1, the present test apparatus, generally designated 5, includes, in common with my prior test apparatus, a water jacket 10 into which is placed a compressed gas cylinder 11 to be tested. A water jacket head 12 provides a leak-proof lid for jacket 10. Head 12 may incorporate the hydrostatic neck seal described and claimed in my beforementioned prior U.S. patent by means of which high pressure water from a supply line 13 is prevented from escaping from cylinder 11 and by means of which low pressure supply water from a line 14 is prevented from escaping from water jacket 10. Test apparatus 5 would also include a control console (not shown) housing a high pressure hydraulic pump and various gauges and controls useful for carrying out high pressure testing of cylinder 11.

As described more fully in my beforementioned prior U.S. patent, water jacket 10 is typically fabricated from steel, or like material, having sufficient rigidity so as not to be effected by expansion changes of the cylinder under test. Jacket 10 has an open upper end for receipt of cylinder 11 and a closed lower end. In a typical installation, jacket 10 may be mounted in a concrete well of sufficient depth so that the major portion thereof is situated below floor level. A water line 15 interconnects the interior of test jacket 10 with the expansion testing apparatus.

Centrally extending from the underside of water jacket head 12 is a sealing spud 16 which threadingly engages the internally threaded neck 17 of cylinder 11. Head 12 is provided with a lift eye 18 for engagement by the hook of an appropriate overhead crane (not shown). This arrangement permits such crane to be used to insert and remove cylinder 11 from within water jacket 10. Jacket head 12 is provided with a circumferential rubber sleeve 19 which is hydrostatically compressed against the inner surface of jacket 10 to effect a water-tight seal therebetween. High pressure water from supply line 13 is supplied via a coupling 28 to a hose 20 which is adapted for attachment to a connector 21 on head 12. As described more fully in my beforementioned prior U.S. patent, connector 21 communicates via spud 16 with the interior of cylinder 11, thereby providing a conduit for introducing high pressure water into cylinder 11. The hydrostatic neck seal incorporated in head 12 prevents leakage of this high pressure water into jacket 10. Low pressure supply water from supply line 14 is supplied via a line 22 and coupling 28 to a hose 23 which is adapted for attachment to a connector 24 on head 12 so as to provide hydrostatic pressure both for the neck seal and for the expansion of sleeve 19.

Still referring to FIG. 1, and according to the present invention, test apparatus 5 incorporates a first electrically actuated solenoid valve 30 connected between supply line 14 and line 22, a second electrically actuated solenoid valve 31 connected between line 22 and a line 25, third and fourth electrically actuated solenoid valves 32 and 33, respectively, connected between a drain line 26 and lines 25 and 22, respectively, and a fifth electrically actuated solenoid valve 34 connected between supply line 14 and a line 27 connected to water jacket 10. Also included is a chamber 35 connected to line 25, a pressure sensor 36 connected to line 22, and a pressure monitor 37 connected between lines 22 and 25. The operation of these components will be described more fully hereinafter.

Referring now to FIG. 2, test apparatus 5 includes a generally conical pan 40 having a generally cylindrical indentation 41 at the bottom thereof and an electronic balance 42, of known construction, including a digital readout 43. Pan 40 is suspended from the sensing element of balance 42 by means of a spring 44 and a plurality of wires 45 connected between spring 44 and the perimeter of pan 40. Balance 42 is held by a bracket 46 to a planar baseplate 48. Spring 44 passes through a hole 47 in baseplate 48 so that pan 40 is positioned below balance 42 and baseplate 48. Baseplate 48 is bonded to the upper surface of a urethane foam vibration dampener 50 which is in turn bonded to a bulkhead 51 rigidly connected within the control console (not shown).

Vibration dampener 50 and bulkhead 51 have a plurality of holes 52 and 53, respectively, therein through which pass a plurality of support rods 54, the upper ends of which are rigidly connected to baseplate 48. The lower ends of support rods 54 support a second support plate 55. This method of attachment isolates baseplate 48, support rods 54, support plate 55, and balance 42 from vibration and shock which the console and bulkhead 51 may be subjected to in normal use.

A cylinder 56, preferably made from plastic, is positioned on support plate 55 and held in place by a pair of magnets 57 interconnected by means of a bar 58. Magnets 57, positioned above support plate 55, are attracted to magnetic keepers 59 located on the bottom side of support plate 55. A disc 60 is connected to the bottom of indentation 41 of pan 40 and has a diameter which is slightly less than the inside diameter of cylinder 56. Disc 60 acts as a piston in cylinder 56 and its action dampens out vertical and horizontal oscillations of pan 40. Magnets 57 and keepers 59 provide a technique for centering cylinder 56 relative to disc 60 while permitting slight movement of cylinder 56 to adapt to changes in the physical orientation of the elements of apparatus 5. Thus, cylinder 56 is permitted to center itself relative to disc 60, preventing frictional drag that could lead to inaccuracies in the weight measurement.

The combined action of piston 60 and spring 44 control oscillation forces from either environment or system operation so that they are not transmitted to the sensing element of balance 42. Such oscillations, if not eliminated, could cause wide variations in the indicated readings on balance readout 43, with resulting diminished accuracy.

Test apparatus 5 further includes a pair of supply lines 61 and 62 which are connected together and connected to support rods 54 by an adjustable clamp 63. Supply lines 61 and 62 are adjusted so that they do not contact pan 40, so that the end of line 62 is approximately at the same level as the start of indentation 41 in pan 40, and so that the end of line 61 extends well into indentation 41. The end of line 62 establishes a zero line 64 for apparatus 5. By making line 61 longer, it is ensured that line 61 terminates at a point below the surface of the water in pan 40. This is important to prevent the entry of air into this line which could cause serious inaccuracies in determining the amount of expansion of the test jacket fluid.

The other ends of lines 61 and 62 are connected by rubber hoses 65 and 66, respectively, to a pair of electrically actuated solenoid valves 67 and 68, respectively, rubber hoses 65 and 66 isolating lines 61 and 62 from vibrations in the system. Valve 67 is connected to line 15 which, as explained previously, is connected to water jacket 10. Valve 68, on the other hand, is connected to a source of vacuum via a line 69.

As will be explained more fully hereinafter, lines 15 and 61 conduct fluid from water jacket 10 into and from pan 40. By making pan 40 conical, a significant amount of water may be added thereto without substantially changing the water level therein. Furthermore, an additional function of spring 44 is to lower pan 40 by extension thereof as water enters pan 40 from line 61. Spring 44 is chosen to have a modulus of deflection which allows the water level therein to remain approximately aligned with zero line 64 as water is added to and removed from pan 40. This proportional movement of pan 40 eliminates any hydrostatic head effects on water jacket 10 that could vary the true volume of expansion water therefrom. A fluid overflow tube 70 is attached near the edge of pan 40 and tube 70 free-floats inside of a larger tube 71 connected to the drain line.

Two electrodes 72 sense the water level in pan 40 so that if such water level is substantially above zero line 64, a circuit is closed and a pilot light (not shown) is energized indicating that the water level in pan 40 is above zero. This would be abnormal only before the test cycle is initiated and will only occur if for some reason a test is aborted part way through the total cycle. A manual push-button may be provided to actuate solenoid valve 68 by applying a signal thereto via an electrical input line 68' to connect line 62 to the source of vacuum to lower the water level to zero line 64 prior to the start of a test. Achievement of this will be indicated by extinguishment of the "above zero" pilot light.

An output plug 74 from balance 42 provides a connection for the signal output thereof that can be connected to various devices such as magnetic tapes; cards, or printers to store, record, and/or produce hard copies of readout 43 of electronic balance 42. Connections 75 provide a means of conducting a remote signal to balance 42 to zero the reading of balance 42 at the proper time. Power input to balance 42 is via connections 76 that pass through a power filter and stabilizer 77 to prevent spurious signals or current surges from disrupting the operation of balance 42.

OPERATION

In operation, the conventional compressed gas control valve (not shown) is removed from the interior threads of neck 17 of cylinder 11 and cylinder 11 is filled with water. Water jacket head 12 then is connected to cylinder 11 by threadingly inserting the lower end of sealing spud 16 into cylinder neck 17. Sealing spud 16 need not be tightened excessively into cylinder 11, hand tightening being sufficient; the high pressure seal between head 12 and cylinder 11 is provided by the neck seal of my before-mentioned prior U.S. patent.

Next, an overhead crane is hooked to lift eye 18 on head 12 and used to raise cylinder 11 into position over test jacket 10. Cylinder 11 is then lowered until completely situated within test jacket 10. When so lowered, rubber sleeve 19 of head 12 seats within the upper end of test jacket 10, head 12 being supported by a projecting lip 12' at the upper end thereof. If desired, the crane then may be disconnected from eye 18.

Hoses 20 and 23 are then connected to connectors 21 and 24 and the test procedure may be started. The test cycle is sequenced by a conventional electronic sequence timer, not shown. When the sequence is started, a signal is simultaneously applied via electrical lines 32', 33', and 34' to valves 32, 33, and 34, respectively, to close valves 32 and 33 and to open valve 34 for approximately one second to add make-up water to test jacket 10 to compensate for any water that was lost during insertion of cylinder 11 into jacket 10. Next, valves 30 and 31 receive electrical signals via lines 30' and 31', respectively, to open same for approximately 3½ seconds to pressurize head 12 via valve 30 and line 22 and to pressurize chamber 35 via valve 31 and line 25. Pressure sensor 36 senses the sealing pressure applied to head 12 and if it does not reach a predetermined pressure, a signal is generated on output line 36' to interrupt the program. If the program continues, pressure monitor 37 compares the seal pressure of head 12 with the pressure trapped in chamber 35. If the seal pressure of head 12 drops below the pressure in chamber 35 by more than a predetermined amount as a result of leakage, a signal is generated on output line 37' to interrupt the program. A pilot light and a buzzer may be provided to signal a seal pressure malfunction.

At this time, a signal is applied via electrical line 67' to open valve 67 to connect line 61 to test jacket 10 via line 15 and valve 67 remains open until signaled to close at the completion of the test. By closing valve 67 except during the test, this ensures that all the fluid is not siphoned out of pan 40, thereby drawing air into the test jacket fluid expansion line 15 which would cause serious inaccuracies.

Simultaneously with the opening of valve 67, valve 34 is again signaled over line 34' to open for a short internal, approximately 0.5 seconds, to add water, if necessary, to line 15, hose 65, line 61, and pan 40. Simultaneously, valve 68 is signaled over line 68' to open, for approximately 2.5 seconds, to level the water in pan 40 prior to continuation of the test. A signal from the electronic control circuit is now applied via lines 75 to electronic balance 42 to zero readout 43.

At this time, test apparatus 5 is ready to proceed with the expansion testing of cylinder 11 and balance 42 should indicate a reading of zero. Printing apparatus could be signaled at this time to print out the first zero check. If balance 42 does indeed read zero, the operator opens the pressurization valve connected to line 13 and pressurizes cylinder 11. This can be done either automatically or manually and is achieved in conventional manner as described in my beforementioned prior U.S. patent. Upon pressurization of cylinder 11, the water expelled from jacket 10 is conducted via line 15, hose 65, and line 61 into pan 40, the weight of which water is measured by balance 42.

When pressurization is complete, readout 43 of balance 42 provides an indication of total expansion, balance 42 being calibrated to directly convert weight to a cubic centimeter volume relationship. Since conventional testing procedures require the pressurization of cylinder 11 to be maintained for at least 30 seconds, the testing procedure continues for this time, after which the printing circuitry may be again signaled to print out the readout 43 of balance 42 to ensure that the reading remained the same during the test.

After the testing pressure has been held for the required interval of time, the valve in line 13 is either manually or automatically opened to release the test pressure. As the pressure is released from cylinder 11 and it returns to its normal state, the water in pan 40 is siphoned via line 61, hose 65, and line 15 back into water jacket 10. After a sufficient time period to permit stabilization of cylinder 11, readout 43 of balance 42 is again read and/or printed out to determine permanent expansion. If cylinder 11 is operating properly, all of the water should be siphoned out of pan 40, to zero line 64, and the reading should again be zero. A positive reading will indicate a permanent expansion of cylinder 11.

After permanent expansion is read, valve 67 is signaled via line 67' to close to prevent further siphoning of water from pan 40 and/or lines 61 and 15. At this time, valves 32 and 33 are signaled via lines 32' and 33', respectively, to open to depressurize chamber 35 and to unlock test head 12. Upon removing hoses 20 and 23 from connectors 21 and 24, respectively, head 12 and cylinder 11 may be removed from water jacket 10 and the test cycle is completed.

It can therefore be seen that according to the present invention, there is provided a method and means for volumetric expansion testing which solves the problems encountered heretofore. According to the present method and means, the conventional water jacket volumetric expansion method of hydrostatic testing of compressed gas cylinders may be substantially automated so as to achieve greater productivity without sacrificing any of the accuracy and repeatability requirements established in Department of Transportation regulations. System 5 could also be applied to the direct expansion method of hydrostatic testing wherein the amount of water pumped into a vessel to pressurize it to a specific test pressure is recorded and then the water is returned back to the calibrated supply reservoir and any difference from the original volume is interpreted as an elastic expansion of the vessel under test.

The present method utilizes the principal of weighing the displaced fluid to determine volumetric change. This is achieved in a manner which establishes the zero starting point automatically and repetitively so as to provide the required degree of speed and accuracy. The present method utilizes a sensitive electonic balance 42 which is mounted in such a manner as to isolate it from extraneous vibrations, thereby preventing fluctuations in the readings that could lead to inconsistencies in the data. The present method includes a technique for conducting fluid to and from collecting pan 40 without imposing any forces thereon which could be transmitted to the sensing element of balance 42. Pan 40 is suspended from balance 42 by a spring 44 which permits the water level in pan 40 to remain very close to zero line 64 as water is added to and removed therefrom so that hydrostatic head forces do not occur. A novel floating piston assembly restricts excessive lateral or vertical movement of pan 40 without imposing forces thereon that could effect the weight sensing action. The use of valve 67 in expansion line 15 prevents the siphoning back of the fluid out of pan 40 when the test jacket is open. Pressure switch 36 and pressure monitor 37 prevent erroneous readings in the event of head leakage or failure of the test jacket sealing mechanism.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. Apparatus for hydrostatically testing the expansion of a vessel immersed in a fluid-filled jacket when subjected to an internal pressure comprising:
   means for sensing weight including a sensing element;
   fluid collection means operatively connected to said sensing element of said sensing means;
   means for conducting the fluid expelled from said jacket when said pressure is applied to said vessel into said fluid collection means, said weight sensing means providing an indication of the volumetric change in said vessel; and
   means permitting the fluid level in said fluid collection means to remain substantially constant as fluid is added to and removed therefrom.

2. Apparatus according to claim 1, wherein said sensing means comprises:
   an electronic balance.

3. Apparatus according to claim 2, wherein said electronic balance is calibrated to directly interpret volumetric expansion as a function of weight and further comprising:
   readout means for displaying total and permanent volumetric expansion.

4. Apparatus according to claim 1, wherein said fluid collection means comprises:
   a conical pan suspended below said sensing element of said sensing means.

5. Apparatus according to claim 1, wherein said means permitting the fluid level in said fluid collection means to remain substantially constant comprises:
   a spring suspending said fluid collection means from said sensing element of said sensing means, said spring having a modulus of deflection which permits the fluid level in said fluid collection means to remain substantially constant as fluid is added to and removed therefrom.

6. Apparatus for hydrostatically testing the expansion of a vessel immersed in a fluid-filled jacket when subjected to an internal pressure comprising:
   means for sensing weight including a sensing element;
   a conical pan;
   means for suspending said conical pan from said sensing element of said sensing means; and
   means for conducting the fluid expelled from said jacket when said pressure is applied to said vessel into said conical pan without physically contacting said conical pan, said weight sensing means providing an indication of the volumetric change in said vessel.

7. Apparatus according to claim 6, wherein said conical pan has an indentation at the center thereof for receipt of fluid and wherein said fluid conducting means comprises:
   a conduit extending into said indentation in said conical pan, below the level of fluid therein.

8. Apparatus according to claim 7 further comprising:
   conduit means connected from a source of vacuum and extending into said conical pan, said conduit means terminating at a point adjacent the intersection between said conical pan and said indentation for establishing the zero fluid level in said conical pan.

9. Apparatus for hydrostatically testing the expansion of a vessel immersed in a fluid-filled jacket when subjected to an internal pressure comprising:
   means for sensing weight including a sensing element;
   fluid collection means;
   means for suspending said fluid collection means from said sensing element of said sensing means;
   means for conducting the fluid expelled from said jacket when said pressure is applied to said vessel into said fluid collection means, said weight sensing means providing an indication of the volumetric change in said vessel;
   a baseplate, said weight sensing means being mounted on said baseplate; and
   a sheet of vibration dampening material, said baseplate being mounted on said sheet.

10. Apparatus according to claim 9, wherein said baseplate and said sheet of vibration dampening material have aligned holes therein, said suspending means extending through said aligned holes for suspending said fluid collection means beneath said baseplate and said sheet.

11. Apparatus according to claim 10, wherein said suspending means comprises:
    a spring operative to further isolate said weight sensing means from external vibrations.

12. Apparatus according to claim 9 further comprising:
    a support plate positioned in parallel, spaced relationship to said baseplate, beneath said baseplate and said fluid collection means;
    means for suspending said support plate from said baseplate;
    a disc connected to the bottom of said fluid collection means, parallel to said support plate;
    a cylinder positioned on said support plate, said cylinder having an inside diameter which is slightly greater than the diameter of said disc, said disc extending into said cylinder and being movable relative thereto to restrict excessive lateral or vertical movement of said fluid collection means; and
    means for restraining movement of said cylinder relative to said support plate.

13. Apparatus according to claim 12, wherein said means for restraining movement of said cylinder comprises:
    first magnetic means mounted above said support plate, within said cylinder, said first magnetic means moving with said cylinder above said support plate; and
    second magnetic means positioned below said support plate and being poled to attract said first magnetic means to maintain said first magnetic means in contact with said support plate.

14. A method of hydrostatically testing the expansion of a vessel immersed in a fluid-filled jacket when subjected to an internal pressure comprising the steps of:
    connecting a fluid collection means to a weight sensing member;

conducting the fluid expelled from said jacket when said pressure is applied to said vessel to said fluid collection means;

maintaining the fluid level in the fluid collection means substantially constant as fluid is added to and removed therefrom; and interpreting the weight indicated by said weight sensing member to determine the volumetric change in said vessel.

15. A method according to claim 14 wherein the step of connecting a fluid collection means to a weight sensing member comprises the step of:

suspending a conical pan below said weight sensing member by means of a spring; and wherein the step of maintaining the fluid level substantially constant comprises the step of:

providing said spring with a modulus of deflection which permits the fluid level in said pan to remain substantially constant as fluid is added to and removed therefrom.

16. A method according to claim 15, wherein the step of conducting fluid to said fluid collection means is performed without physically contacting said fluid collection means.

* * * * *